United States Patent
Maurer

[11] 3,955,695
[45] May 11, 1976

[54] MACHINE WITH AN OUTRIGGER LATCHING MECHANISM

[75] Inventor: Herman J. Maurer, Terre Haute, Ind.

[73] Assignee: J. I. Case Company, Racine, Wis.

[22] Filed: Nov. 18, 1974

[21] Appl. No.: 524,352

[52] U.S. Cl. ............................ 214/140; 212/145; 214/138; 280/765; 24/208 A
[51] Int. Cl.² .................. B66S 9/00; B66C 23/62; B60S 9/00
[58] Field of Search ............... 212/145, 28, 55; 214/130 R, 141, 140, 138; 280/150.5; 254/86 R; 248/145, 202, 354 R, 439; 24/90 PR, 208 A

[56] References Cited
UNITED STATES PATENTS

| | | | |
|---|---|---|---|
| 752,731 | 2/1904 | Wallace | 280/150.5 |
| 1,193,052 | 8/1916 | Pirsch | 280/150.5 |
| 3,213,507 | 10/1965 | Christian et al. | 24/208 A |
| 3,365,214 | 1/1968 | Gainett | 212/145 X |

FOREIGN PATENTS OR APPLICATIONS

| | | | |
|---|---|---|---|
| 251,178 | 6/1970 | U.S.S.R. | 212/145 |
| 983,015 | 2/1965 | United Kingdom | 24/208 A |
| 611,709 | 1/1961 | Canada | 24/208 A |

Primary Examiner—Robert J. Spar
Assistant Examiner—R. B. Johnson
Attorney, Agent, or Firm—Dressler, Goldsmith, Clement & Gordon, Ltd.

[57] ABSTRACT

In heavy mobile construction machinery such as backhoes, power shovels and boom cranes, wherein outriggers are extended for lateral stabilization, a latching mechanism is provided to restrain an outrigger in its retracted inoperative position when not in use. The mechanism is operable in response to simple hydraulic actuation of the outrigger, and does not require manual operation or remote controls to effect locking or release of the mechanism.

2 Claims, 3 Drawing Figures

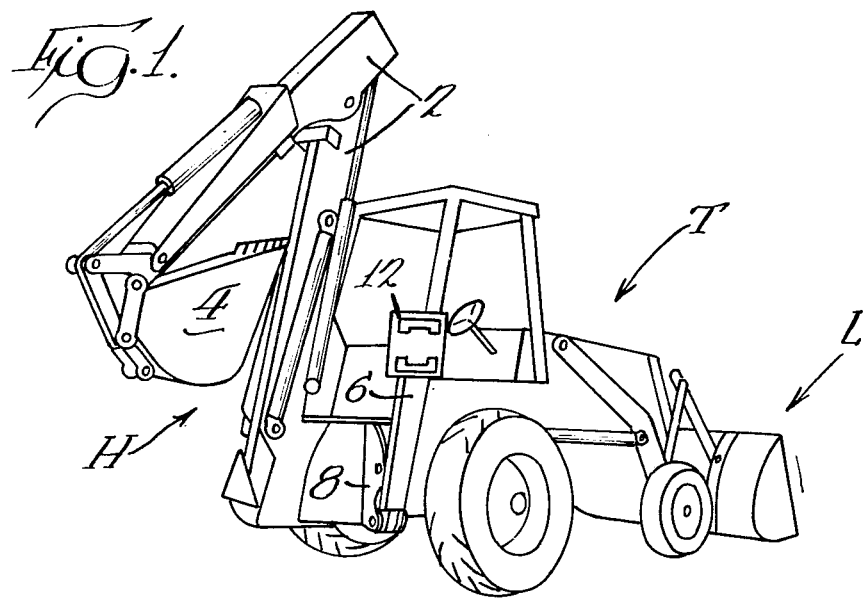
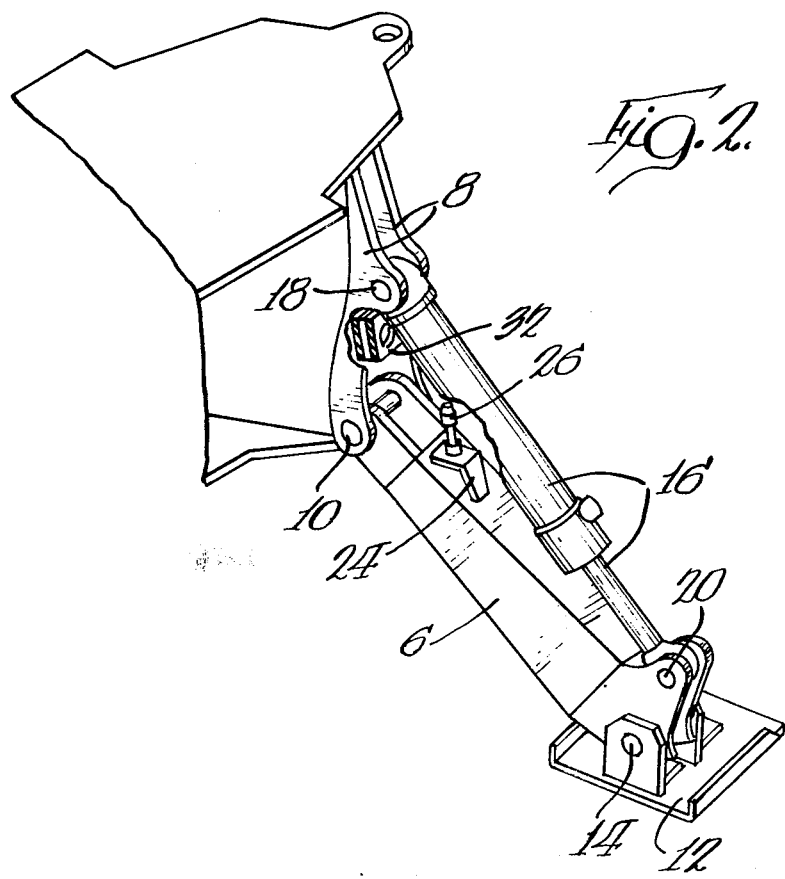

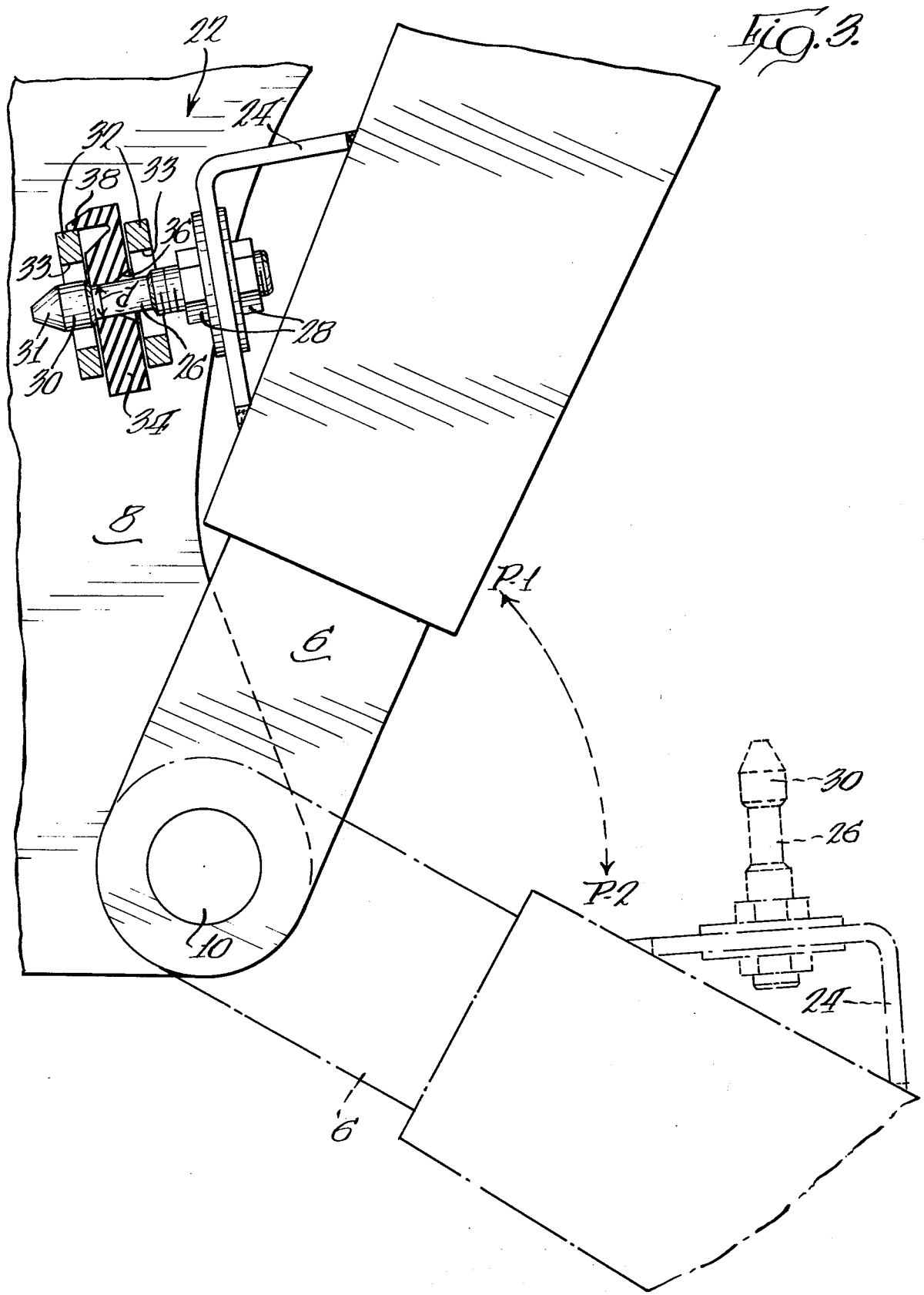

MACHINE WITH AN OUTRIGGER LATCHING MECHANISM

BACKGROUND OF THE INVENTION

Most construction vehicles such as backhoes, power shovels and boom cranes have outriggers which are extended downwardly from their side frames to engage the ground and provide lateral stabilization against tipping of the vehicle. These outriggers typically are hydraulically powered to anchor them against the ground when the machine is not in operation, and to retract them upwardly to an inactive position when the machine is in transit or not in operation. If the hydraulic system itself is relied upon to maintain the outriggers firmly in their inactive positions, the outriggers have a tendency to droop downwardly due to various factors, such as cooling of the system after operation, and hydraulic system leakage. Any substantial "drooping" of an outrigger is undesirable, particularly when a vehicle is being transported along the highways.

Manually operated mechanical latches of the type shown in Garrett U.S. Pat. No. 3,365,214, for example, have been provided for the purpose of locking an outrigger in its retracted position. The principal disadvantage of such latches, linkages and the like is that the machine operator must dismount from his seat in order to release or lock the outrigger arm.

It is the principal object of this invention to provide an improved means for restraining an outrigger of the type described in its retracted inactive position.

SUMMARY OF THE INVENTION

In accordance with this invention there is provided latching mechanism for securing an outrigger arm against the side of the frame of a heavy piece of mobile machinery when the outrigger is in its raised and inactive position. The mechanism preferably comprises a resiliently biased detent mechanism operable in response to force exerted through the outrigger arm.

BRIEF DESCRIPTION OF DRAWINGS

In the accompanying drawings:

FIG. 1 is a pictorial illustration of a combination backhoe and front end loader incorporating an outrigger latching mechanism in accordance with this invention;

FIG. 2 is a perspective view of an outrigger in its extended position, and showing the latching mechanism in accordance with this invention; and FIG. 3 is a side elevation of the inner outrigger hinged bracket mounting and the latching mechanism, shown partially in axial cross-section.

DESCRIPTION OF THE PREFERRED EMBODIMENT

Referring to FIG. 1, a preferred embodiment of the invention will be described in its application to the well-known type of equipment which comprises a self-propelled tractor T which carries a hydraulically operated bucket loader L at its front end and a hydraulically operated backhoe H at its rearward end. The conventional backhoe H comprises an articulated boom 2 carrying a toothed bucket 4. By means of hydraulic cylinders the bucket is caused to perform digging movements pivotally, vertically, in an arcuate path, and swinging from side to side. In the course of off-center lateral movements in particular, the machinery requires stabilization against being tipped over by the load on the extended boom 2, and such lateral stabilization is provided by an extensible outrigger arm 6 at each side of the tractor frame.

Each outrigger arm 6 comprises a box-section steel weldment which is hingedly connected to a bracket comprising machine frame weldments 8 by means of a pin 10. A corrugated or toothed steel pad 12 is pivotally connected to the distal end of each arm by a pin 14, and is adapted to engage the ground for static anchoring of the outrigger. The outrigger arm 6 can be raised and lowered by remote control of a hydraulic piston and cylinder unit 16 which is pivotally connected between bracket 8 and the outer end of arm 6, by pins 18 and 20, respectively. The unit 16 may be considered part of the movable outrigger arm.

The improvement in the form of a latching mechanism which is the subject of this invention is generally indicated at 22 in FIG. 3. Latching mechanism 22 consists of bracket means which includes an L-shaped bracket 24 is welded to the upper side of the arm 6. A round spike or pin 26 has a threaded end secured in the bracket 24 by a pair of nuts 28, and its other protruding end has a stepped head portion 30 of a larger diameter, which then has a 30° taper to form a pointed nose 31.

The bracket means also includes a pair of spaced plates 32 having openings 33 and the plates are affixed to bracket 8 to provide a fixture to hold an elastomeric ring 34 having a central opening or socket with a 60° taper at its entrance. The internal diameter $d$ of ring 34 when in relaxed condition is sufficiently smaller than the outside diameter of the pin 26 as to establish an interference fit when the head of pin 26 is projected completely through the ring 34. In an actual, although not limiting, embodiment of the invention, the relaxed internal diameter $d$ of ring 34 was 0.590 inch and the diameter of head portion 30 was 0.625 inch. The suitability of various commercially available synthetic elastomeric materials will be readily apparent to those skilled in the art. However, as an example, a polyurethane designated as Disogrin No. 6545, available from Disogrin Industries, is considered to be suitable for this purpose.

An advantageous feature of ring 34 is that it is easily removable from its fixture in case replacement is desired. Ring 34 incorporates a lip 38 which retains it in place when the pin 26 is withdrawn therefrom. Another advantageous feature is that the latching mechanism 22 is "self-cleaning," in that any dirt on the pin 26 will be rubbed off and caused to fall downwardly from in front of or behind the ring 34.

From the foregoing description it will be evident that in operation the machine operator need not dismount from his seat in order to lock or release the latching mechanism 22, but needs only to operate the hydraulic cylinder 16 and the force of the outrigger's movement will be sufficient to insert into or remove the pin 26 from within the elastomeric ring 34. The pin 26, with its enlarged end 30, and the elastomeric ring 34, together provide a resiliently biased detent device which is operable solely by the relative force exerted between these elements.

A remotely controlled latching system employing electrical or hydraulic controls could be provided but, of course, such a system would entail additional cost and servicing complexities.

It should be understood that the invention is not strictly limited in its application to a backhoe type of machine requiring lateral stabilization, but is similarly applicable to other types of mobile equipment wherein similar problems are encountered as, for example, in boom cranes, power shovels, and the like.

It will be further understood that various departures from the specifically disclosed embodiment of the invention may be effected without departing from the scope thereof, as defined by the claims:

I claim:

1. In a mobile heavy machine having a frame with a load-lifting boom and at least one outrigger arm pivotally mounted on the frame and movable between a lower ground-engaging position and a substantially vertical raised and inactive position, power means for pivoting said outrigger arm, said outrigger arm being adapted to provide lateral stabilization for the machine, the improvement comprising a latching mechanism securing said outrigger arm against said frame when the arm is in said substantially vertical raised and inactive position, said mechanism being operable solely in response to force exerted through said outrigger arm, said mechanism comprising bracket means fixed to said frame, said bracket means including a pair of spaced parallel plates having an opening therein, a resilient member supported by said plates and having a socket therein aligned with said opening in said plates, and a rigid pin secured to said arm, said rigid pin having an enlarged head portion on an outer end which head portion has a size greater than said socket in said resilient member so that movement of said head portion through said socket in said resilient member will cause said resilient member to expand and subsequently contract after said enlarged portion passes through said socket.

2. In a machine according to claim 1, wherein said resilient member comprises a ring of elastomeric material.

* * * * *